United States Patent [19]

Graille et al.

[11] Patent Number: 5,264,241
[45] Date of Patent: Nov. 23, 1993

[54] PROCESS FOR MANUFACTURING DAIRY PRODUCTS WITH A REDUCED STEROL CONTENT

[75] Inventors: Jean Graille, Villeneuve les Maguelonne; Daniel Pioch, Prades le Lez; Michel Serpelloni, Beuvry-les-Bethune; Léon Mentink, Estaires, all of France

[73] Assignee: Roquette Freres, France

[21] Appl. No.: 785,161

[22] Filed: Oct. 31, 1991

Related U.S. Application Data

[63] Continuation of Ser. No. 545,062, Jun. 29, 1990, abandoned.

[30] Foreign Application Priority Data

Jun. 29, 1989 [FR] France ................. 89 08730

[51] Int. Cl.⁵ .............................. A23C 15/00
[52] U.S. Cl. .................... 426/664; 426/422; 426/491; 426/586
[58] Field of Search .......... 426/417, 491, 614, 603, 426/586, 480, 641, 663, 664, 422; 554/8, 193

[56] References Cited

U.S. PATENT DOCUMENTS 3,491,132  1/1970  Reiners et al. .
4,880,573  11/1989  Courregelongue et al. ... 426/417 X

OTHER PUBLICATIONS

Potter, N. N., Food Science, 1978, pp. 380-390, 404-411, 491-495, AVI, Westport, CT.
Patent Abstracts of Japan, vol. 6, No. 114 (C-110) [992], Jun. 25, 1982; and JP-A-57 43 639.

*Primary Examiner*—Joseph Golian
*Assistant Examiner*—Leslie Wong
*Attorney, Agent, or Firm*—Larson and Taylor

[57] ABSTRACT

Process for manufacturing products with a reduced content of sterols and particularly of cholesterol, characterized in that the starting material is composed at least in part of dairy cream and is in the form of an oil-in-water emulsion, and in that it consists essentially of:

- contacting the starting material with a sufficient amount of cyclodextrin to form inclusion complexes with the sterols present in the fat, so as to render them extractable;
- inverting the oil-in-water starting emulsion into a water-in-oil emulsion;
- extracting the complexes formed in whole or in part.

15 Claims, No Drawings

PROCESS FOR MANUFACTURING DAIRY PRODUCTS WITH A REDUCED STEROL CONTENT

This application is a continuation, of application Ser. No. 545,062 filed Jun. 29, 1990 now abandoned.

TECHNICAL FIELD

The present invention relates to a process for manufacturing dairy products with reduced sterol content.

Among these products, the following deals more particularly with the case of butter without this constituting a limitation to the present invention.

BACKGROUND OF THE INVENTION

Sterols and more specifically cholesterol are compounds present in animal fats entering into the composition of many foodstuffs, among which butter.

Now it has long been established that high blood levels of cholesterol (cholesterol LDL) are in direct correlation with serious cardio-vascular diseases.

The principal among them is atherosclerosis which is manifested by alteration in the wall of the arteries and of which one of the causes is the localized, excessive and abnormal deposit of cholesterol on the inner surface of the wall of an artery. The atheroma so formed can have tragic consequences like myocardial infarction. By way of illustration, it can be indicated that a reduction of 1% of the total blood cholesterol results in a reduction of 2% in the coronary risk. The excess cholesterol can also be the cause of gallstones.

Prevention remains one of the most effective means for remedying these disorders. It consists of reducing as much as possible the ingestion of cholesterol-rich foods or also of consuming food stuffs with a reduced content of cholesterol.

The concern of foodstuff industries is hence to remove cholesterol from products such as animal fats.

Thus, there have already been proposed various methods of extracting sterols from fats.

One of them consists of placing the animal fat in contact with digitonin which has the property of reacting with the cholesterol to give a precipitate. The performance and results of this method are not satisfactory due to the fact of the difficulty of separation of the precipitate from the medium. This method is, in any event, inapplicable industrially, especially for foodstuffs.

The cholesterol can also be extracted from fats by removal by means of a solvent. The main drawback of this process is that the solvents generally employed are toxic and there always remain traces in the fats concerned.

Microdistillation processes are also known, inapplicable on the industrial scale, as well as adsorption processes on columns as described, for example, in European patent application EP No. 0174848 and EP No. 0318326. These applications teach a process according to which the fat kept in the liquid state passes through an adsorbent column, in the event activated charcoal. It is clear that such a process is very laborious to employ and moreover the extraction that it permits is not very selective.

Another physico-chemical process of extraction of cholesterol from fats is disclosed by the Japanese patent application JP No. 59-140299. It consists of contacting a dry substance charged with cholesterol such as powdered milk, with supercritical $CO_2$ at a temperature comprised between 35° and 45° C. and at a pressure comprised between 130 and 200 atm. The obtaining of these physical conditions necessitates the use of complex and cumbersome equipment. The conducting of the process is thus very delicate. Moreover, as is specified in the patent application, other lipid compounds are entrained by the super critical $CO_2$. This process is hence not selective.

To remove sterols from fats, there has also been contemplated a process of bio-degradation of said sterols disclosed by patent application EP No. 0278794 and employing bacteria which, contacted with the fat, are adapted to metabolise at least one of the sterols that it contains. Like all processes bringing fermentation into play, this bio-degradation process is very delicate to conduct due to the fact of the variability inherent in living matter. In addition, the equipment employed, and the relatively long duration are, among other things, elements which render such a process laborious. Finally, the catabolites produced during these fermentations remain until now totally unknown as regards their nature and their toxicity and are, in any case, present in the fat so treated.

Through European patent application EP No. 0256911 a process for elimination of the cholesterol contained in a fat of animal origin is also known. It is based on the property already disclosed of cyclodextrins (cyclic polyglucoses of frustoconic tubular conformation with 6, 7 or 8 glucose units and denoted respectively by alpha, beta or gamma cyclodextrin) of receiving in their hydrophobic central cavity molecules of sterols and especially of cholesterol, to form inclusion complexes soluble in water. According to this process, the fat kept fluid id contacted with a cyclodextrin with stirring for 30 minutes to 10 hours so as to enable the formation of complexes. The separation of the latter is then effected by introduction of water into the reaction medium, which solubilises these complexes. The aqueous solution so obtained is then collected after decantation.

The extraction yield of the cholesterol by this process is hardly considerable. In the best cases, it is only 41%, and this after three successive extractions as is indicated in Examples 3 of the description of this European patent application.

Apart from these scarcely satisfactory performances, this process constitutes a succession of additional steps in the manufacture of a foodstuff. In fact, the procedure if it was adopted, for example in the case of butter, would necessitate firstly manufacturing the fat-based product, in an anhydrous form, subjecting it to the extraction treatment of the cholesterol, then of bringing it into its form of finished foodstuff, that is to say reconstituted butter. This process would necessarily hence be expensive in time, in equipment and in energy. Moreover, is is to be noted that according to this process the fat must be kept melted under an oxygen-free atmosphere. These technical characteristics involve resorting to a specific apparatus for maintaining the temperature and the supply of neutral gas. Lastly, the duration necessary solely for the first phase of complexation is at the minimum 30 minutes and in reality from 2 to 3 hours as indicated in the examples.

It emerges from the foregoing that none of the prior art solutions has permitted until now the production of food fats impoverished in sterols particularly in cholesterol-satisfactorily, that is to say responding to the industrial conditions of economic profitability, of flexibility of use, and of the quality of the final product.

SUMMARY OF THE INVENTION

It is an object of the present invention to overcome the aforesaid drawbacks of the prior art.

To achieve this, Applicant Company has first addressed itself to reformulating the technical problem posed which consisted of eliminating sterols from fats.

Thus, the present invention is an improvement in a process for manufacturing dairy products reduced in sterol content, including cholesterol content, wherein an oil-in-water emulsion comprising dairy fat is used as a starting material, fat is separated from said emulsion in an intermediate step of said manufacturing process and treated with cyclodextrin to remove sterols as inclusion complexes of cyclodextrin and sterols, oil-in-water emulsion with said treated fat is reformed and used to complete said dairy product manufacture.

Thus it has appeared more opportune to focus on methods of manufacturing dairy foodstuffs derived from dairy cream, for example butter, containing fats, by improving them so that they enable the obtaining of products with a reduced content of sterols. It must be remarked that this first procedure was not obvious since, in spite of the existence already of long standing of preoccupations with regard to cholesterol, it had not yet ever been contemplated.

In a second stage, Applicant has conducted a whole series of studies and researches, especially within the fats division of IRHO-CIRAD on processes of manufacturing products derived from dairy cream which led to demonstrating the fact that, quite surprisingly and unexpectedly, cyclodextrin contacted with dairy cream presented in the form of an oil in water emulsion, complexes the cholesterol present, that it then suffices to invert the starting oil in water emulsion into water in oil emulsion and that the cyclodextrin/sterol inclusion complexes having no affinity for the fatty phase, it is then easy to remove them by any suitable means known in itself.

Contrary to what seemed foreseeable, dairy cream does not interfere with the phenomenon of complexation.

The present invention relates also to a process for manufacturing dairy products impoverished in sterols in which the starting substance used is composed, at least in part, of dairy cream and is in the form of an oil-in-water emulsion, and consisting essentially:

of contacting with the starting substance a sufficient amount of cyclodextrin to form inclusion complexes with the sterols present in the fat, so as to render them extractable from the latter;

inverting the starting oil-in-water emulsion into a water-in-oil emulsion;

extracting all or part of the complexes formed.

These two latter steps can proceed successively or simultaneously.

Such a process permits excellent integration of the manufacturing operations. It does not in any way disturb the development of the dairy products derived from the dairy cream. In addition, it only makes the cost price of the products a little dearer since, on the one hand, it does not necessitate additional heavy equipment nor the overconsumption of energy and on the other and, it does not lengthen the duration of the conventional manufacturing process practically at all. Finally, it enables the sterols ratio to be considerably reduced.

DETAILED DESCRIPTION OF THE INVENTION

Within the scope of the invention, the term "cyclodextrin" must be understood as encompassing cyclic oligo-saccharides constituted by 6, 7, or 8 glucopyranose units of which one at least can be mono- or poly-substituted, the polymers of which the monomers are constituted by these cyclic oligo-saccharides, and those products grafted or immobilized on an inert support.

Without this being limiting, the present invention relates, particularly, to the manufacture of butter with a reduced cholesterol content.

At this stage, it would be useful to proceed with some remarks on the traditional manufacture of butter.

In this manufacture, the raw material employed is cream. The latter is in fact milk enriched with fat, obtained by spontaneous creaming or centrifuging. It is constituted by an oil-in-water emulsion or colloidal suspension of particles (globules of fat and protein micellae) in a dispersing aqueous phase which can represent 30% to 90% of the total weight, generally around 55% to 65%.

Conventionally, this cream is then subjected to a pasteurization taking place at a temperature of the order of 90° C. for 30 to 90 seconds and whose purposes are the following:

destruction of pathogenic germs;

destruction of the greater part of the original microflora;

destruction of the lipases, which are rancidity development factors;

and the formation of reducing sulphur products, which counter the oxidation of the fat.

The step which follows is that of maturation of the cream. It consists of a fermentation intended on the one hand to lower the pH by conversion of the lactose into lactic acid, and on the other hand to develop flavors, diacetyl in particular. This operation enables the optimization of the manufacture and the preservation of the butter and improves its organoleptic qualities.

It should be noted that this "biological" maturation may be eliminated or replaced by a "physical" maturation (Nizo process). In this case, the cream will not have undergone lowering of pH; it will be qualified as "sweet".

This cream matured or not serves as a basis for the essential operation of manufacturing butter, namely butyrification. The latter rests on modification of the suspension of fat globules with inversion of the phases of the emulsion. Depending on the processes, a larger or smaller proportion of the fat globules is destroyed by mechanical stirring.

The initial oil in water fluid emulsion constituted by dairy cream, gives rise to a two phase medium constituted on the one hand by butter which is an emulsion of water in oil titrating about 80% of fat, and on the other hand butter milk or aqueous phase containing lactose, proteins, inorganic salts and lipids.

In conventional batchwise churning and in the most widely spread continuous churning processes, it is the stirring that produces this conversion. These processes treat creams of average concentration from 30 to 40% of fat at a temperature of the order of 6°-7° C. for "sweet" creams and comprised between 9° and 13° C. for "sour" creams. This temperature is dependant on the composition of the fat which varies as a function of the seasons.

The inversion of the emulsion results in reality from the conjugation of mechanical stirring and the following parameters: acidity of the cream, fat content, temperature.

Destabilisation of the emulsion is the consequence of the destruction of the membrane of the fat globules situated at the aqueous phase-fatty phase interface: the fat ensures a continuous link between initially neighbouring globules. This metamorphosis is manifested by the appearance of butter grains, whose average diameter can vary from some tenths of a millimeter to some millimeters after churning. The fat phase thus becomes a continuous phase imprisoning the aqueous phase droplets, their proportions by weight being respectively 82% minimum and 16% maximum (proportions which are in accordance with French regulations). The non-fat dry matter represents about 2% of the weight of the butter. The size of the various particles (water droplets, fat globules, air bubbles) present in butter varies with temperature, and the speed and duration of the churning.

To terminate, separation of the excess aqueous phase or butter fat is effected by malaxation of the butter. In this way, the essential of the aqueous phase, constituting at the start the continuous phase of the cream, is expelled from the inter-granular space of the butter. The malaxation is preferably associated with washing with water.

It is to be noted that, according to the alternative method of manufacture of butter called the method of Nizo (Netherlands) and indicated above, the fermentary maturation of the cream is replaced by a "physical" maturation (5 h at 6° C.). The seeding by flavoring and acidifying strains is only done then in the course of the malaxation.

Under the conditions of the process according to the present invention as applied to butter manufacture, it turns out that cyclodextrin has a remarkable affinity for the sterol fraction of which 98% is cholesterol. The complexation yield is excellent. The cholesterol in complex form has lost its affinity with respect to the fat globules of the lipid phase. It thus becomes dispersible in water and can consequently be easily separated from the butter. The butter thus obtained shows an extremely low cholesterol level.

Advantageously, the content of fat of the cream used is comprised between 10 and 70% by weight and preferably between 35 and 45% by weight.

The cyclodextrin employed is of the alpha, beta or gamma type, preferably beta, substituted or not. The mono- or poly-substituent groups of the cyclodextrin can be especially alkyls such as hydroxypropyl or saccharides of the glycosyl, maltosyl type or the like. Its concentration varies from 0.01 to 25% by weight with respect to the fat, preferably from 0.5 to 18% and more preferably still from 1 to 10%, for example of the order of 8% by weight.

In the process of the invention, the cream undergoes possibly a heat treatment of the pasteurization type, or UHT sterilization, possibly a maturation either biological aimed at acidifying and flavoring or "physical", then necessarily an emulsion inversion such as churning at a substantially controlled and constant temperature, followed by malaxation preferably associated with a washing with water.

In the case of physical maturation of the cream, the acidification and flavoring are carried out in the course of the malaxation.

The cyclodextrin may be added to the cream at any time before the emulsion inversion, but preferably immediately before the latter.

According to a preferred embodiment of the process according to the invention, there are introduced into an industrial cream whether heat treated or not and with a content of fat comprised between 35 and 45% by weight, beta-cyclodextrin in powder form at a concentration comprised between 1 and 10% by weight, preferably of the order of 8% by weight with respect to the fat. The beta-cyclodextrin employed is for example of the type marketed by the ROQUETTE FRERES Company under the trademark KLEPTOSE ® having the form of a white and fine powder and containing about 13 to 14% of water. The cream is then stirred moderately for at least some seconds, and preferably at least 120 seconds, at a temperature preferably comprised between 5° and 20° C. and corresponding to the normal churning temperature.

Following this, the cream is stirred mechanically at said temperature, for a sufficient time to permit the formation of grains of butter. The latter are then separated from the butter milk and then are subjected to a malaxation operation preferably associated with a washing with water.

According to a modification of the invention, prior to the introduction of cyclodextrin, there is added to the cream about 2% of milk seeded with lactic leavens so as to produce a fermentation of a duration of the order of 16 hours, at a temperature of about 30° C.

According to another modification of the invention, prior to the introduction of cyclodextrin, the cream is subjected to physical maturation consisting of storage at a temperature comprised between 4° and 8° C., preferably substantially equal to 6° C. for about 6 hours. In addition, in the course of malaxation, the butter mass is seeded with a mixture of lactic ferments and with an acid culture concentrate.

This modification shows that the pH only seems to have a slight effect on the complexation of the cyclodextrins with the sterols and particularly with cholesterol.

The process according to the invention enables a reduction of the cholesterol level in butter. In addition, the addition of beta-cyclodextrin has no disturbing effect on the manufacture of butter either qualitatively or quantitatively.

The process according to the present invention can also be applied to the manufacture of anhydrous dairy fat (ADF). Said manufacture can be performed directly from cream or indirectly, from a butter obtained by employing the manufacturing process according to the invention and described above.

In any case, the invention will be better understood by means if the following non-limiting examples.

EXAMPLE I

Butter manufacture employing a traditional process by churning and without prior maturation.

In this Example, the starting material is pasteurized industrial cream containing 40% by weight of fat comprising itself 0.13% by weight of cholesterol, namely 394 mg of cholesterol per 300 g of cream.

The churning is carried out in the laboratory by means of a device comprising:

A mixer (Phillips, model HR 1480) provided with whisks is placed above a polypropylene beaker containing cream. The latter is immersed in a water bath kept at constant churning temperature, namely 10° C. in summer and 13° C. in winter.

The electric mixer is connected to the mains through an auto-transformer, in order to be able to vary the rotary speed. Lighting suitably positioned above the installation facilitates observation of the manipulation, in particular during the destabilization of the emulsion. A chronometer completes this equipment.

For the churning the stirring system (whipping mixer) is adjusted to 90–100 rpm. Visual observation enables the progress of the inversion process of the emulsion to monitored. After about 15 minutes, there is foam formation with an increase in volume (over-run).

The expulsion of the fat is then effected by shearing between the whips and against the walls of the beaker. Suitable lighting enables a trained observer to detect the appearance of the small grains (diameter less than 1 mm) which accompanies the "collapse of the foam", after about 30 minutes. This is the moment when the butter milk separates from the butter grains. The color of the solid changes and suddenly becomes yellow. The churning is terminated about 40 minutes after the start of the manipulation and the butter grains have then the size of rice grains.

The washing and the separation of the aqueous phase (butter milk plus washing water) are effected in a filter, above a receiving beaker. This filter was mounted in the laboratory by means of a steel cylinder (height 13 cm, diameter 8 cm) and a grid of a metallic sieve calibre 80 mesh, solidly fixed.

The heterogeneous mixture obtained after churning, is decanted into the filter and the butter milk flows by gravity into the receiving beaker. The washing is done by means of a washbottle with a volume of demineralized water cooled to 10° C. or 13° C., equal to three times the volume of the cream. During the stirring with the spatula, the butter grains increase in volume and agglomerate in the form of clumps.

The butter is then decanted into a tared beaker where it undergoes the malaxation operation by trituration with a spatula, intended to render the butter more compact and to thus facilitate the removal of the excess aqueous phase; the latter is added to the filtrate obtained. After the latter step, the beaker is weighed to determine the amount of butter and to establish a manufacturing balance sheet.

In this Example, the yield by weight of the manufacture corresponding to the ratio:

$$\frac{\text{weight of butter obtained}}{\text{theoretical weight of butter}} \times 100 \text{ is of the order of } 88\%$$

The theoretical weight of butter is calculated by assuming that the ratio of incorporation of the fat from the cream in the butter is 100% knowing that the legal composition of butter is as follows:

| | |
|---|---|
| fat | 82% |
| water | 16% |
| degreased dry extract | 2% |

The batch of butter obtained possesses a total cholesterol ratio of the order of 0.17% by weight.

The method of determination of the total cholesterol employed is thin layer chromatography on a gel of silica 60, with a direct deposit of the butter sample solubilized and previously treated by methanolysis in an acid medium. The development is performed by means of a reagent with vanillin in the presence of ortho-phosphoric acid. Colorimetric determination on a photodensitometer is then carried out.

EXAMPLE II

Manufacture of butter by employing the process according to the invention by churning and without maturation of the cream.

The starting material used is, as in Example I, pasteurized industrial cream with 40% of fat, not matured, and containing cholesterol at a ratio of 0.13% by weight.

According to the invention, there is introduced directly into this cream 10 g, namely 8.3% by weight with respect to the fat, of powdered beta-cyclodextrin with a water content comprised between 13 and 14% and marketed by Applicants under the name of KLEPTOSE$^R$. The medium so obtained is then homogenized under conditions of moderate stirring, for a half hour, at a temperature equal to the churning temperature, namely 10° C. in summer and 13° C. in winter.

The methodology employed is then strictly identical with that described above for Example I.

The manufactured yield by weight of butter observed is of the order of 90%.

The addition of beta-cyclodextrin does not modify the manufacture of the butter quantitatively nor qualitatively.

The manufactured batch of butter possesses for its part a ratio of total cholesterol of 0.045% by weight, which represents a reduction of 73.5% with respect to the cholesterol ratio of the butter obtained by the traditional process described in Example I.

EXAMPLE III

Manufacture of butter by employing a traditional process by churning with maturation of the cream.

In this Example, there was first of all carried out a maturation of 300 g of pasteurized industrial cream whose fat content was 40% by weight. Its cholesterol ratio was about 0.13% by weight (392 mg of cholesterol per 300 g).

The maturation was performed by seeding by means of lactic leaven rich milk at the dose of 2% with respect to the fat of the cream and fermentation without stirring for 16 hours at 30° C.

The lactic leavens were obtained previously by seeding with lyophilised lactic ferments (0.70 g, Laboratoires G. Roger-77260 La Ferte-sous-Jouarre) of a liter of UHT sterilized whole milk and by fermentation without stirring for 24 hours at 30° C.

The cream maturated to a pH of the order of 5 is then subjected to the traditional steps described above of churning, malaxation and washing.

The manufactured yield by weight of the butter obtained is of the order of 90%. It is similar to that observed for the process using non-maturated cream as a starting material.

The cholesterol level of this butter is about 0.17% by weight.

EXAMPLE IV

Manufacture of butter by employing the process according to the invention by churning and with maturation of the cream.

Maturation to a pH of 5, the addition of beta-cyclodextrin and the final manufacturing operations were carried out under the same conditions as those described in the preceding examples.

At the start 300 g of industrial pasteurized cream, identical with that employed in Example III, was used.

The manufactured yield by weight of the butter was of the order of 86%, which corresponds substantially with that mentioned in Example III describing the traditional process without the addition of the beta-cyclodextrin.

The proportion of free cholesterol of the butter obtained was about 0.051% by weight. The reduction by 70% of the proportion of cholesterol present in the butter with respect to that measured in the butter obtained by employing the process of Example III, is of the same order as that observed in comparative Examples I and II.

These examples demonstrate the advantageous performance of the process according to the invention in two of these embodiments.

It appears thus that this process enables the production, reproducibly, of butter which, on the one hand, is of amount and quality comparable with those of butter obtained by conventional processes, and which on the other hand, has an extremely low content of cholesterol.

It is self-evident that the process according to the invention can be applied to all known techniques of butter manufacture whether they are of the type by discontinuous or continuous (Fritz process) churning, or indeed of the type with double centrifugation like the ALPHA or GOLDEN FLOW processes.

EXAMPLE V

Influence of the content of beta-cyclodextrin in the cream on the efficiency of extraction of the cholesterol from butter manufactured under the same conditions as those of Example IV.

Table I groups the different results obtained for increasing concentrations of powdered beta-cyclodextrin, marketed under the registered trademark KLEPTOSE$^R$ by the ROQUETTE FRERES Company and containing 13 to 14% water. The extraction yield of the cholesterol is calculated in the following way:

$$R = 100 - \frac{\text{Ratio of cholesterol in \% by weight in the butter for a concentration of X\% of beta-cyclodextrin*}}{\text{Ratio of cholesterol in \% by weight in the butter without addition of beta-cyclodextrin}} \times 100$$

*X is given in % by weight with respect to the fat of the cream.

EXAMPLE VI

Manufacture of anhydrous dairy fat (ADF) with a reduced content of cholesterol by an indirect technique from butter obtained by employing the process according to the invention (Examples II, IV and V).

In this indirect technique, the butter of Example II with low content of cholesterol is first of all melted by heating to a temperature below 80° C., of the order of 65° C. It then undergoes an operation such as double centrifugation completed by washing with water so as to separate the non-fat phase from the fatty or oil phase of butter. The latter is subjected to drying under vacuum so as to remove the residual water to bring it to a concentration below 0.2% by weight. The ADF so obtained is very low in cholesterol.

EXAMPLE VII

Manufacture of anhydrous dairy fat (ADF) with low cholesterol content by a direct technique In the direct technique, dairy cream is employed as starting material. After mixing the latter with cyclodextrin, the inversion of the emulsion is performed mechanically by means of equipment known in itself of the homogenizer, clarifier type or the like. The butter oil obtained after separation of a large portion of the aqueous phase, is brought to a temperature of the order of 60° C. for washing with warm water then is finally dried under vacuum to reach a water content of 0.20% by weight. The ratio of cholesterol of the anhydrous dairy fat thus manufactured is very much reduced.

The butter and the anhydrous dairy fat, of reduced cholesterol and obtained by the techniques described in the preceding examples can naturally be consumed as such or employed as foodstuff ingredients in different products such as pastries, ice creams, dessert creams, reconstituted milks or cheeses, spreading pastes, creams of the "Coffee Whitener" types, or the like.

We claim:

1. In a process for manufacturing dairy products reduced in sterol content, including cholesterol content, wherein an oil-in-water emulsion comprising dairy fat is used as a starting material, fat is separated from said emulsion in an intermediate step of said manufacturing process and treated with cyclodextrin to remove sterols as inclusion complexes of cyclodextrin and sterols, oil-in-water emulsion with said treated fat is reformed and used to complete said dairy product manufacture, the improvement comprising directly contacting said oil-in-water emulsion starting material with cyclodextrin during said manufacturing process, without any intermediate step of separating said fat from said oil-in-water emulsion, to form inclusion complexes with the sterols,

TABLE I

| Concentration of β-cyclodextrin KLEPTOSE | | Amount of butter (g) | | Manufacturing yield (% by weight) | Amount of cholesterol in the butter (mg) | Cholesterol ratio (% by weight/ butter) | Cholesterol extraction efficiency (%) |
|---|---|---|---|---|---|---|---|
| (g) | % by weight/to the fat of the cream | obtained | theoretical | | | | |
| 0 | 0 | 128 | 146 | 88 | 229 | 0.18 | 0 |
| 2.5 | 2.08 | 127 | 146 | 87 | 172 | 0.135 | 25 |
| 5 | 4.16 | 133 | 146 | 91 | 133 | 0.10 | 44 |
| 10 | 8.33 | 126 | 146 | 86 | 67 | 0.053 | 71 |

THis table proves that the reduction of the cholesterol of the butter is directly dependant on the amount of beta-cyclodextrin KLEPTOSE$^R$ added to the cream.

inverting the contacted oil-in-water emulsion into a water-in-oil emulsion and separating at least part of said complexes.

2. Process according to claim 1, wherein the dairy product which is manufactured is butter.

3. Process according to claim 1, wherein the dairy product which is manufactured is anhydrous dairy fat.

4. Process according to claim 1, wherein the content of said dairy fat is comprised between 10 and 70% by weight.

5. Process according to claim 1, wherein the content of said dairy fat is comprised between 35 and 45% by weight.

6. Process according to claim 1, wherein the cyclodextrin is of the alpha-, beta- or gamma- type, substituted or not.

7. Process according to claim 1, wherein the cyclodextrin is in polymerized form.

8. Process according to claim 1, wherein the cyclodextrin is used in an amount of 0.01 to 25% by weight with respect to the dairy fat.

9. Process according to claim 1, wherein the cyclodextrin is used in an amount of 0.5 to 18% by weight with respect to the dairy fat.

10. Process according to claim 1, wherein the cyclodextrin is used in an amount of 1 to 10% by weight with respect to the dairy fat.

11. Process according to claim 1, comprising a step of heat treatment of the starting material of the pasteurization or UHT sterilization type, before the inversion of the oil-in-water emulsion.

12. Process according to claim 1, comprising a step of maturation of the starting material before the inversion of the oil-in-water emulsion.

13. Process according to claim 1, wherein the inversion of the oil-in-water emulsion is produced by churning, carried out at a controlled temperature comprised between 5° and about 20° C.

14. Process according to claim 2, wherein the mass of butter obtained after the step of inversion of the emulsion is washed with water and malaxed so as to separate the butter from the butter milk.

15. Process according to claim 3, wherein the butter obtained is melted, the fatty phase is separated from the aqueous phase by means of the double centrifugation type, and the residual water is evaporated from the fatty phase so as to bring the water content to a value of below 0.2% by weight.

* * * * *